March 13, 1956     J. F. MORSE     2,737,822
REMOTE MOTION TRANSFER MECHANISM
Filed April 21, 1953
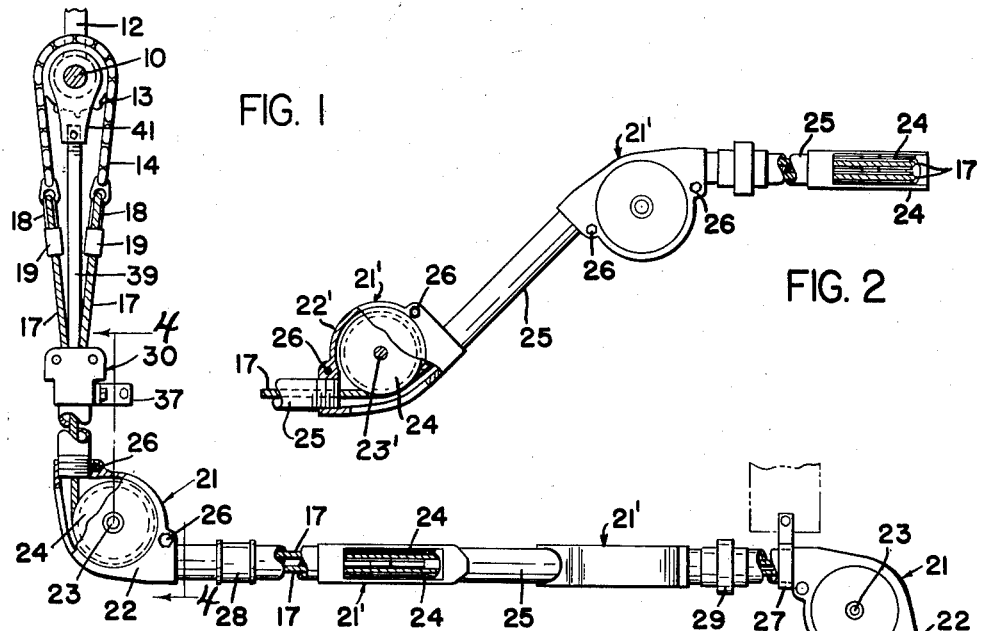
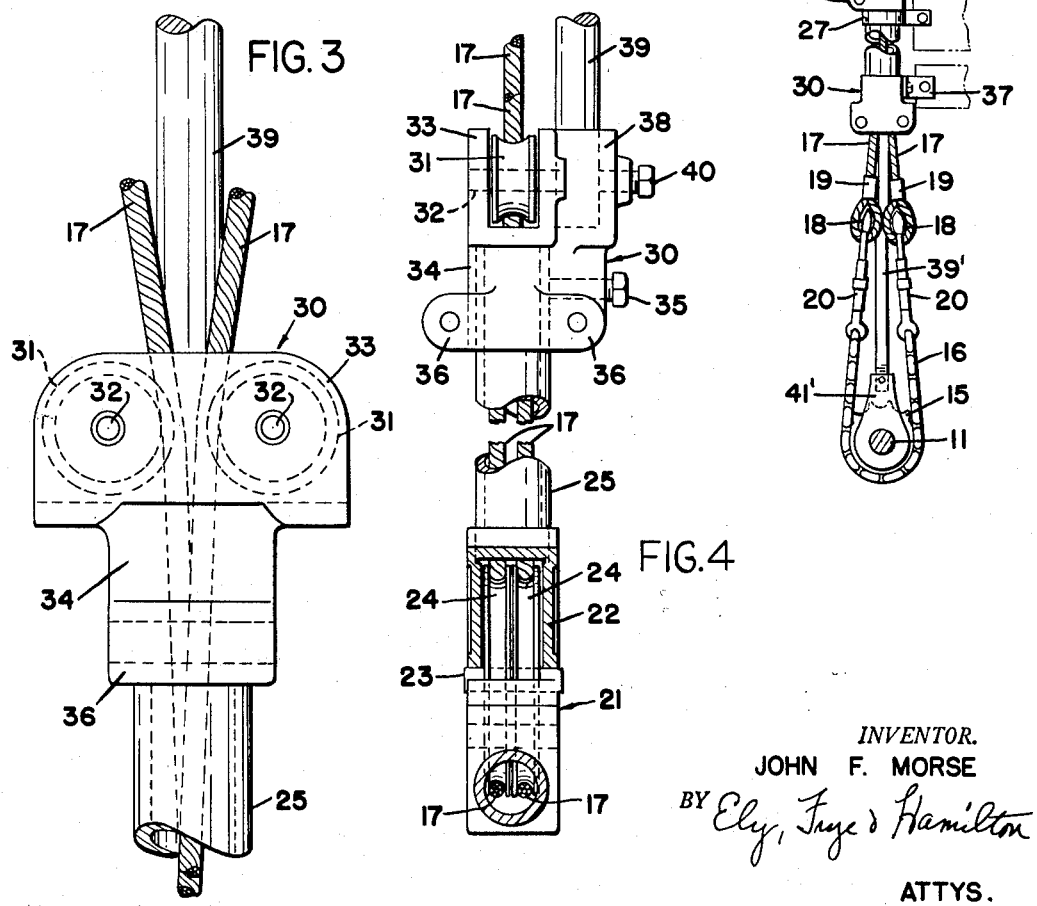
INVENTOR.
JOHN F. MORSE
BY Ely, Frye & Hamilton
ATTYS.

United States Patent Office 2,737,822
Patented Mar. 13, 1956

2,737,822

REMOTE MOTION TRANSFER MECHANISM

John F. Morse, Hudson, Ohio

Application April 21, 1953, Serial No. 350,177

3 Claims. (Cl. 74—222)

The invention relates generally to systems for transferring motion between remote locations, and more particularly to novel mechanism whereby two remote machine elements may be controlled or coordinated.

While the mechanism of the present invention is particularly adapted for marine installations to provide a simple and effective control between the pilot house and the engine room, it also has wide adaptation in various other fields, such as industrial and mining machinery, earth moving equipment and transportation equipment, where a remote motion transfer system is required. In this application the invention will be described by way of example as applied to a marine motion transfer installation.

A system of ropes over pulleys for the remote control of the rudder is almost as old as ships themselves, and in more modern ships having engines, such a system of ropes or cables has been, and still is used for connecting controls in the pilot house to the engine as well as the rudder because it has proven to be the most practical, effective and dependable. However, a conventional cable and pulley system has a number of disadvantages.

One disadvantage is that since the cable system must be specially designed and built for each particular boat or installation, the cost is high. Also, the multiplicity of unprotected pulleys and long lengths of exposed cables subjects them to damage and abrasion, shortening their useful lives and requiring substantial maintenance and adjustment. A most serious disadvantage arises from the fact that in any hull structure there is a considerable amount of relative twisting and other movement of the parts due to the stresses imposed by seaway and by expansion and contraction. All of these forces tend to cause the pulleys to shift and work loose in their mountings, which increases the amount of slack in the system and requires almost constant adjustment. However, even when properly adjusted, there is still a considerable amout of sponginess in the system because the pulleys are independently mounted and can flex or move on their supports under load.

Because of these disadvantages of a conventional cable and pulley system, a variety of substitute remote motion transfer mechanisms have been devised including mechanical push-pull cables, mechanical push rods with bell cranks and ball joints, mechanical torsion systems, hydraulic, electric, vacuum and air systems. Each of these substitute mechanisms or systems has had its own peculiar disadvantages, usually in addition to one or more of the disadvantages of conventional cable and pulley systems, and for the large majority of installations the cable and pulley system is still the most practical, efficient and dependable.

The object of the present invention is to provide a novel remote motion transfer mechanism of cables and pulleys which will overcome the aforesaid disadvantages of the conventional cable and pulley system while retaining the advantages thereof.

More specifically, it is an object of the present invention to provide a remote motion transfer system which is simple and inexpensive to install and maintain, which has high efficiency and high load carrying capacity, which requires a minimum amount of adjustment, which can be repaired in the field by unskilled persons, and which can be made in a few standardized sizes to suit a variety of requirements.

These and other objects are accomplished by the parts, combinations and arrangements comprising the present invention, a preferred embodiment of which is shown in the accompanying drawings and described in detail herein. It is to be understood that various changes and modifications in details of construction and arrangement may be made without departing from the scope of the invention as defined within the scope of the appended claims.

Referring to the drawing:

Fig. 1 is a somewhat schematic view of a cable and pulley system embodying the invention;

Fig. 2 is a partial plan view thereof, partly in section;

Fig. 3 is an enlarged front elevation of one of the novel terminal blocks supporting compression struts connected to the driving and driven shafts at the ends of the system; and Fig. 4 is a side elevation and partial section, as on line 4—4, Fig. 1, of a terminal block and the adjacent elbow mounting pulleys around which the two strands of the cable from the terminal block are trained.

The cable and pulley system of Fig. 1 is shown, by way of example, applied to a control or driving shaft 10 which may be located in the pilot house of a ship for transferring motion to a shaft 11 in the engine room. The shaft 11 may be operatively connected to the governor or other part of the engine, or to the rudder. The control shaft 10 may be rotated by a hand lever 12 fixed thereon, and its motion is transferred to the shaft 11 through the cable and pulley system comprising the present invention.

In accordance with conventional practice, the shaft 10 has a sprocket 13 over which a roller chain 14 passes, and the shaft 11 has a sprocket 15 over which a roller chain 16 passes. The ends of the roller chains 14 and 16 are connected to a cable and pulley system including pairs of pulleys for the strands of cable at each turn in direction, so that when shaft 10 is oscillated its motion is transferred through the system to shaft 11.

The ends of roller chains 14 and 16 are connected to the ends of the cable strands 17 by suitable thimbles 18 and sleeves 19, and preferably turnbuckles 20 are interposed between the roller chain and thimbles at one or both ends of the system. As shown, two turnbuckles 20 are interposed between the roller chain 16 and thimbles 18, for adjusting the tension in the cables 17. In the cable and pulley system of the present invention, each pair of pulleys for the cable strands is mounted in an elbow, and the elbows are connected by rigid conduits through which the cable strands pass.

The elbows can be made in standard types, for example, a 90° turn and a 45° turn, and all the pulleys in the system are mounted in a plurality of these elbows. The 90° elbow 21 includes a housing 22 having a pulley shaft 23 on which two identical pulleys 24 are journaled in side-by-side relation. The housing 22 has internal pipe threads at each end into which lengths of pipe or conduit 25 are screwed. Similarly, the 45° elbow 21' has a housing 22' carrying a pulley shaft 23' journaling two pulleys 24, and the housing has internal pipe threads at each end into which conduits 25 are screwed.

As indicated in Figs. 1 and 2, the elbows 21 and 21' may be provided with mounting bolts 26 for rigidly mounting them on the frame or hull directly or by means of suitable brackets. Alternately, the elbows may be mounted by means of pipe clamps 27 if desired. Lengths of the conduit 25 may be connected together between elbows by means of suitable sleeve couplings 28 or separable couplings 29.

After leaving the roller chain 14 at the control shaft 10 the cable strands 17 pass through a terminal block 30 connected to the entrance end of the conduit line. Similarly, the cable strands 17 pass through an identical terminal block 30 at the exit end of the conduit line before connecting with the roller chain 16. As best shown in Figs. 3 and 4, the terminal blocks 30 have opposed rollers or pulleys 31 which guide the cable strands 17 into the entrance end of the conduit so they will pass therethrough without contact or abrasion with the sides.

The pulleys 31 are mounted on shafts 32 in a bracket portion 33 on one end of the terminal block housing, the other end 34 of which is internally threaded to receive the threaded end of a length of conduit 25, or a set screw 35 may be screwed into the housing to engage and hold the conduit. Obviously, if desired, the block 30 may be provided with dual bracket portions 33 for mounting two pairs of pulleys 31 to guide cable strands into a dual conduit and pulley system for dual controls to the engine room.

The lower end 34 of the terminal block housing is preferably provided with a pair of bracket ears 36 for anchoring the block to a frame or hull member. The ears may receive bolts for mounting the block on a suitable bracket secured to the frame member, as shown at 37 in Fig. 1. The upper end of the terminal block housing may be provided adjacent the bracket portion 33 with an offset socket 38 for receiving one end of a compression strut 39, and a set screw 40 is screwed into the socket to secure the strut therein. The other end of the strut is secured to some part of the control shaft unit, such as a bearing or housing member therefor. As shown, the upper end of the strut 39 may be received in a socket in a yoke member 41 carried on a bearing on shaft 10. The other terminal block 30 is similarly connected by a strut 39' and yoke member 41' to a bearing on the shaft 11, or the engine or shaft unit embodying shaft 11.

The compression struts 39 and 39' between the shafts 10 and 11 and terminal blocks 30 take the thrust between the shafts and the ends of the conduit system, so that the entire thrust of the system is carried to the shafts or the units embodying the shafts. The combination of the struts and blocks with the rigid elbows and conduits provides for positive centering of all the pulley shafts between the control shaft 10 and the driven shaft 11, regardless of external variables caused by hull distortion or loosening of mounting attachments and brackets. In other words, the rigid conduit, strut and elbow combination provides a noncompressible structure which insures maintaining the centers of the various pulleys in proper relative location with a minimum amount of adjustment and maintenance. Moreover, the conduit and elbow system protects the cable strands from wear and abrasion throughout their entire passage through various parts of the framework or hull stucture.

Accordingly, an extremely simple and inexpensive motion transfer system is provided by the mechanism of the present invention comprising a minimum number of standard parts which can be manufactured and sold as a "package unit" to fit a variety of requirements. All that is necessary is to specify the number of 90° and 45° elbows required, the approximate length of conduit, which can be standard pipe and fittings, and the type of strut connections to the control and driven shafts.

Thus, the major disadvantages of a cable and pulley system, such as high installation and maintenance cost, are overcome by the present invention, while retaining the advantages of the system, including efficiency, practicability and dependability.

What is claimed is:

1. Mechanism for transferring motion from a control shaft unit including a control shaft to a remote driven shaft unit including a driven shaft, said mechanism comprising an endless cable system having two cable strands operatively connected to both shafts for transferring rotation of one shaft to the other, a conduit system enclosing both runs of the cable and terminating adjacent to said shafts, said conduit system including elbows at the direction turns, each said elbow having a pair of coaxial pulleys guiding both runs of the cable, a terminal block connected to each end of the conduit system in spaced relation to the adjacent shaft unit and having opposed pulleys guiding the cable runs into the conduit, each terminal block having a socket offset laterally of said opposed pulleys, and a compression strut having one end secured in said socket and the other end connected to the adjacent shaft unit.

2. Mechanism for transferring motion from a control shaft unit including a control shaft to a remote driven shaft unit including a driven shaft, said mechanism comprising an endless cable system having two cable strands operatively connected to both shafts for transferring rotation of one shaft to the other, a conduit system enclosing both runs of the cable and terminating adjacent to said shafts, said conduit system including elbows at the direction turns, each said elbow having a pair of coaxial pulleys guiding both runs of the cable, each elbow having means for mounting it on a support, a terminal block connected to each end of the conduit system in spaced relation to the adjacent shaft unit and having opposed pulleys guiding the cable runs into the conduit, each terminal block having means for mounting it on a support and having a socket offset laterally of said opposed pulleys, and a compression strut having one end secured in said socket and the other end connected to the adjacent shaft unit.

3. Mechanism for transferring motion from a drive shaft unit including a drive shaft to a remote driven shaft unit including a driven shaft, said mechanism comprising a chain and sprocket on each shaft, a pair of cable strands connecting the ends of said chains to make an endless cable system operatively connecting the two shafts, a conduit system enclosing said cable strands and including elbows at the direction turns, a pair of pulleys coaxially mounted in each elbow guiding the cable strands, a terminal block connected to each end of said conduit system in spaced relation to the adjacent shaft unit and having opposed pulleys guiding said cable strands into the conduit, each terminal block having a socket offset laterally of said opposed pulleys, and a compression strut having one end secured in said socket and the other end connected to the adjacent shaft unit.

References Cited in the file of this patent

UNITED STATES PATENTS

| | | |
|---|---|---|
| 1,650,336 | Farmer | Nov. 22, 1927 |
| 1,935,806 | Mautsch | Nov. 21, 1933 |
| 2,476,249 | Payne, Jr. | July 12, 1949 |

FOREIGN PATENTS

| | | |
|---|---|---|
| 991,087 | France | June 13, 1951 |